United States Patent
Mehta

(10) Patent No.: US 9,524,509 B2
(45) Date of Patent: Dec. 20, 2016

(54) CLIENT SIDE BROWSER NOTIFICATION

(71) Applicant: Yahoo! Inc., Sunnyvale, CA (US)

(72) Inventor: Satish Mehta, Union City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 858 days.

(21) Appl. No.: 13/852,985

(22) Filed: Mar. 28, 2013

(65) Prior Publication Data

US 2014/0298211 A1  Oct. 2, 2014

(51) Int. Cl.
*G06Q 30/02* (2012.01)

(52) U.S. Cl.
CPC .......... *G06Q 30/0241* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 8,712,847 | B2* | 4/2014 | Bosco | G06Q 30/02 705/14.6 |
| 2003/0093285 | A1* | 5/2003 | Colace | G06Q 30/02 705/1.1 |
| 2005/0050097 | A1* | 3/2005 | Yeh | G06F 17/3087 |
| 2006/0069618 | A1* | 3/2006 | Milener | G06F 17/30902 705/14.73 |
| 2006/0224445 | A1* | 10/2006 | Axe | G06Q 30/02 705/14.69 |
| 2011/0125594 | A1* | 5/2011 | Brown | G06Q 30/02 705/14.73 |
| 2011/0231265 | A1* | 9/2011 | Brown | G06Q 30/02 705/14.73 |

OTHER PUBLICATIONS

Schackman, et al, Application titled "Interactive Reveal Ad Unit," filed Nov. 26, 2012, U.S. Appl. No. 13/685,366, 55 Pages.
Hepworth, et al, Application titled "Graphical User Interface," filed Apr. 24, 2012, U.S. Appl. No. 29/419,494, 4 Pages.
Hepworth, et al, Application titled "Infinite Wheel User Interface," filed Apr. 27, 2012, U.S. Appl. No. 13/458,976, 54 Pages.

* cited by examiner

*Primary Examiner* — Maryam Ipakchi
(74) *Attorney, Agent, or Firm* — Berkeley Law & Technology Group, LLP

(57) ABSTRACT

Briefly, embodiments of methods or systems for client side browser notification are disclosed.

20 Claims, 3 Drawing Sheets

CLIENT SIDE BROWSER NOTIFICATION

BACKGROUND

1. Field

This disclosure relates to displaying content on a client device, which may result in notifying a server, for example, that content has been displayed in a client browser, such as browsing using an infinite scroll bar (e.g., vertical or horizontal depending, for example, on device orientation).

2. Information

If a client computing platform, such as a laptop, desktop, or handheld computing device, displays an electronically generated "page," (e.g., a web page) for example, by way of an Internet browser or other type of electronic display mechanism, the computing platform may generate signal transmissions, such as signal packets, to indicate loading of the page, for example, to a remote server. One or more signal transmissions may notify an external platform, such as a server, that the page has been loaded in a display screen or window on a client. Signal transmissions, such as these, may be used by Internet-related advertisers, content suppliers, news organizations, and/or other entities to determine which pages may be popular among users, how long pages comprising certain content may be displayed by one or more client platforms, demographics of users viewing or interacting with pages displaying content, and/or other variables that may be used to support a host of analyses. By way of a variety of tools, which may sometimes be referred to as "analytics," Internet-related entities may take steps towards providing content that is intended to be progressively more interesting and/or useful to potential audiences, for example.

However, as technology evolves and the nature of user interactions evolve, under certain circumstances it may be difficult or impossible to make appropriate determinations, such as, for example, if an electronically generated page, or portions thereof, has loaded in a browser window and been viewed, for example.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
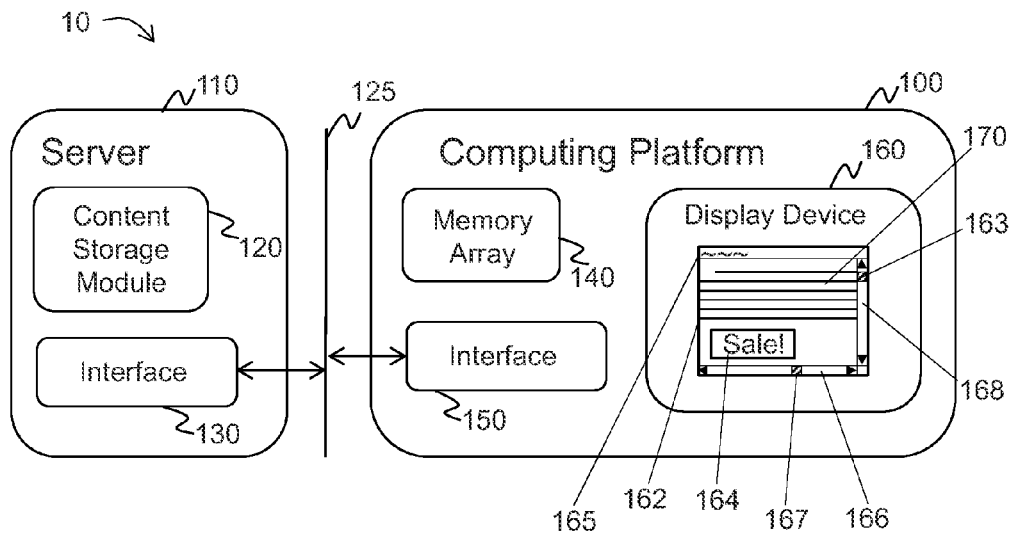
FIG. 1 is a schematic diagram of a system for client side browser notification according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these or similar terms are to be associated with appropriate physical quantities and are intended to merely be convenient labels.

Likewise, in this context, the terms "coupled", "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term coupled may also be understood to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description or usage may provide helpful guidance regarding inferences to be drawn.

It should be understood that for ease of description a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term network device refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting portions of a network via a hardware bridge, as one example, may be done, although other approaches also exist. A hardware bridge, however, may not typically include a capability of interoperability via higher levels of a network protocol. A network protocol refers to a set of signaling conventions for communications between or among devices in a network, typically network devices, but may include computing devices, as previously discussed; for example, devices that substantially comply with the protocol or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance or substantial compatibility. Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers.

In contrast, a virtual private network (VPN) may enable a remote device to communicate via a local network. A router may allow communications in the form of transmissions (e.g., signal packets), for example, to occur from a remote device to a VPN server on a local network. A remote device may be authenticated and a VPN server, for example, may create a special route between a local network and the remote device through an intervening router.

A network may be very large, such as comprising thousands of nodes, millions of nodes, billions of nodes, or more, as examples. Media networks, such as the Yahoo!™ network, for example, are increasingly seeking ways to attract users to their networks and/or to retain users within their networks for extended periods of time. A media network may, for example, comprise an Internet website or group of websites having one or more sections. For instance, the Yahoo!™ network includes websites located within different categorized sections, such as sports, finance, current events, and games, to name just a few non-limiting examples among a variety of possible examples. To attract and/or retain users within its network, Yahoo!™ and/or other media networks may continually strive to provide content relating to categorized sections that may be interesting and/or of use to users.

As more users remain within a media network for extended periods of time, a media network may become more valuable to potential advertisers. Thus, typically, advertisers may be inclined to pay more money and/or provide other considerations to a media network in return for advertising to users, for example, via that media network. In an implementation, if a user displays a page, perhaps as a result of utilizing a search engine, a server (or other source) located within or external to a processing and/or communications infrastructure of a media network may deliver relevant content, which may include, for example, textual and/or multimedia content that may entice users to remain for a relatively extended period of time. Access, such as links to content (e.g., such as hyperlinks to websites located outside of a media network), may also be presented to users. Thus, even if users are directed to websites outside of a particular media network, users may remain loyal to the media network in the future if they believe that the network consistently provides access, such as links, or otherwise directs them to relevant and/or useful content. In this context, the term "content" includes, as examples, images, video, audio, text, and/or multimedia, such in the form of stored physical (e.g., memory) states or in the form of electronic signals, for example.

As a non-limiting example, as a result of submitting a search query, (e.g., terms that may be submitted to a search engine) for example, or as a result of any other type of user interaction with a client computing platform, such as via a browser, a user may access one or more pages (e.g., web pages), for example. In an implementation, a "cookie", (e.g., for example, locally stored physical (e.g., memory) states capturing details regarding a website interaction) may be used to identify a client computing platform, including a computing device, to a server, for example. Content from a server may be arranged on a selected page to be displayed by way of a browser or other type of electronic display window. In addition to content that a user may find relevant and/or useful, an advertisement or other type of promotional message, for example, may also be displayed on a page at a location proximate with one or more content items (e.g., one or more objects).

Content is typically served to client browsers as a web page containing content. Thus, in a typical arrangement, if a page were served and then loaded in a browser window, for example, a client browser may notify a server that a content item, such as video, audio, text, and/or multimedia, had been served and had been loaded. In this context, the term loaded is used to refer to display of served content within a client browser. Such notification may be referred to as an "impression event" or an "impression." For example, notification of serving of content may comprise a first impression and notification of loading of content within a browser may comprise a second impression. For example, a certain number and/or type of impressions may trigger a payment from an advertiser. Further, if a user spends time reading a news article, for example, a client browser may notify a server of an elapsed time spent, for example. If displayed content were accompanied by an embedded object, corresponding to an advertisement or other type of promotional message; however, a client browser may not necessarily notify a server, for example, that an embedded object, for example, has separately (e.g., in addition) been viewed, if served as part of the loaded web page, for example.

Thus, a client computing platform may be incapable of notifying a source or server, for example, that a particular content item, such as an object, rather than a page, for example, has been loaded and/or viewed. At times, serving and loading of a page has been relied upon to indicate that particular objects have been served and loaded. However, with technological changes, in some instances, page-type reporting and/or similar notification tools, which may involve at least an allocated portion of a client browser window being populated with content items and/or embedded objects, may not be effective. For example, a client browser of an extent and/or a shape that exceeds a page may be deployed. A type of "infinite browser" has been described, as one example, in which a web page oriented or type notification may not be effective. See, for example, "Infinite Wheel User Interface," U.S. patent application Ser. No. 13/458,976, filed on Apr. 27, 2012 and assigned to the assignee of claimed subject matter.

A client platform, for example, if displaying content, may allow a user to continuously scroll down for long periods of time without encountering a page bottom in some browser implementations, for example. In some instances, as a user scrolls vertically, e.g., downward or upward, for example, by way of a mouse or other input device, a browser may continue to add content to a lower or upper portion of the browser window. Likewise, a similar approach to horizontal scrolling might also be employed.

Accordingly, a loading process may become a reasonably extensive period of time in such situations, so that advertisers, content suppliers, and/or other interested entities, for example, may not suitably gather analytics. For example, code for gathering such analytics may be written contemplating a typical web page. Without appropriate analytics, however, improvements in providing relevant and/or useful content may be more difficult to achieve. Likewise, measurements, such as time spent reading articles, demographics, and/or other similar measures may be difficult to obtain.

In an example or illustrative embodiment, however, a method may comprise initiating one or more client side signal transmissions responsive to scrolling content to one or more locations within a viewable area of a browser. A client browser may comprise a browser of any extent and/or any shape. For example, in an embodiment, as explained in more detail later, one or more client side signal transmissions may be initiated after a first and second impression are transmitted. Likewise, the one or more client side signal transmissions may include signals providing one or more locations within a browser viewable area and/or signals providing one or more time stamps associated with one or more locations, for example.

In another example or illustrative embodiment, a method may comprise tracking display of content within a browser of any extent and initiating one or more client side signal transmissions substantially in accordance with the tracking. Again, the browser may comprise a browser of any extent and/or any shape. Likewise, as previously mentioned, content served may comprise one or more objects, rather than a conventional web page, for example. Thus, tracking may include tracking a display area other than a page, the display area being an area of a display for any computing device, for example, such as a tablet, a smart phone, a lap top, a desk top, etc. In this example embodiment, the one or more initiated client side signal transmissions may be responsive to the one or more objects occupying one or more locations within a specified region of a display area. For example, the one or more objects may occupy one or more particular locations as a result of scrolling of the content. As mentioned previously above, likewise for this illustration, the one or more client side signal transmissions may be initiated after a first and a second impression are transmitted. Similarly, the one or more client side signal transmissions may include signals providing one or more locations within a browser viewable area and/or signals providing one or more time stamps associated with the one or more locations.

According to yet another implementation discussed herein, for example, a scroll bar feature in a browser window of a client may be implemented in a manner so as to generate an electronic message notifying a source, such as a server, that at least a portion of a content item has been displayed within the browser window. For example, in a particular implementation, served content may be loaded into a local memory of a computing platform, such as cache memory or a memory buffer, for example. A "content storage region," (e.g., cache) may, for example, be associated, at least temporarily, with an allocated display area of a display device. If memory states accessed from a content storage region are displayed within an allocated display area, one or more parameters indicating that content has been displayed may be passed to a scroll bar program executing one a computing device or a network device, for example, so that the scroll bar program may generate an electronic message for transmission, such as in the form of one or more signal packet transmissions. For example, scrolling of content on a device may bring content within a viewable window, whereas previously (e.g., before scrolling) such content may not have been viewable via the display of the device.

For example, in an embodiment, scrolling across a midpoint of a displayable area, such as vertically or horizontally, as one example illustration, may generate one or more signal transmissions. Likewise, as additional content is accessed for display within an allocated display area, additional similar parameters may be passed to a scroll bar program so that additional electronic messages or signal packets may be generated for initiation of transmission, providing additional impressions. Likewise, in an embodiment, other types of operations may produce an impression event type notification. For example, zooming, panning, copying, rotating, etc. may be examples of display related operations that may generate a notification in an embodiment. A host of possible operations may be used to generate a client side notification and it is not intended that claimed subject matter be limited in scope to a particular operation. Thus, for an embodiment, a server, for example, may be notified that particular portions of a content item, which may include text, images, embedded objects, and so forth, have been displayed on a display of a client computing platform, for example. Of course, particular memory locations or portions of cache accessed to correspond with portions of a display may be transparent to a scroll bar program since memory accesses may occur at a lower level of functionality for a device, such as a tablet, smart phone, lap top, etc. Thus, loading content and scrolling a particular amount or another similar user action may in some embodiments be sufficient to generate one or more signal transmissions providing notification.

With respect to displaying embedded objects, in at least some implementations, implementation of a notification related to use of a scroll bar, for example, in connection with a client side browser as an approach to indicate that an embedded object has been displayed may provide a beneficial alternative a web site type approach, such as embedding a type of notification in an object on a web site, for example. Likewise, an approach, such as embodiments discussed herein, may permit generation of signal transmissions, even if viewing displayed content that may be present between particular objects, for example, which may potentially be of use in situations involving third party provided content, for example.

In an implementation, for example, a scroll bar or similar application may be calibrated in a manner to associate a position of a scroll bar, such as a "thumb" that moves along a vertical or horizontal scroll bar "track," with content served (e.g., received), locally stored, and loaded, for example. A particular location or set of locations for a scroll bar thumb positioned on a vertical track, for example, may be associated, by way of calibration, for example, with a range of pixels of content displayed within a client browser on a particular display device in which the extent and/or shape of the browser is not limited to a page. For example, in one possible non-limiting example, a scroll bar thumb located at a top portion of a vertically-oriented scroll bar track may be associated with display of pixels at vertical positions, (e.g., rows) 1-1000 (e.g., a first region). A scroll bar thumb located at a middle portion of a vertically-oriented scroll bar track may correspond to display of pixels at vertical positions (e.g., rows) 1001-2000 (e.g., a second region). Again, this non-limiting example is intended to illustrate that, at least in some implementations; a thumb position on a scroll bar may be calibrated to correspond to a range of pixels for content served, stored locally and loaded.

In another implementation, a rate of change of scrolling, such as a scroll bar thumb or other feature, may be measured or estimated for an approximately horizontal and/or an approximately vertical scrolling direction. A rate of change computation may be useful in implementations, for example, in which a browser may execute instructions that result, at least in part, in revealing more content as scrolling takes place, for example. In some instances, measurement of rate of change (e.g., velocity) of scrolling may permit a scroll bar application, for example, to provide notification that content, such as a promotional message, as an example, was partially viewed as a user scrolled past an embedded object, for example. Measurement of rate of change may additionally be useful in detecting that particular content may have been visible within an allocated display area of a display device for a period of time.

FIG. 1 is a schematic diagram of a system for client side browser notification according to an embodiment 10. In FIG. 1, server 110 represents a source of content for a client computing platform, such as computing platform 100. In some embodiments, server 110 may represent a group or a cluster of servers that may number into the dozens, hundreds, or even thousands. As was mentioned, it is understood throughout this document that groups or clusters of servers may be employed, although a single server may be discussed. Server 110 of FIG. 1 includes content storage module 120, which may comprise a content repository comprising images, articles, multimedia presentations, audio clips, and so forth. Content to be served and stored locally may be conveyed to computing platform 100 by way of network 125 and interface 130. Although not shown in FIG. 1, server 110 may also include processors, user interface modules, displays, and so forth; however, claimed subject matter is not limited to particular hardware and/or software arrangements, such as of server 110.

Computing platform 100 corresponds to a client device, such as a tablet, laptop computer, desktop computer, handheld computing device, such as a smart phone, or the like. Computing platform 100, as shown here, includes memory array 140 and interface 150 for communicating with server 110 by way of intervening network 125. In some implementations, memory array 125 may comprise memory locations, such as a local cache, for example, capable of being accessed by a memory controller so that content locally stored may be displayed by display device 160. As mentioned, however, memory access functionality may be transparent in a particular implementation, such as via hardware, firmware and/or software included in an embodiment.

Display area 162 may represent a viewable display area of display device 160 within which toolbars, scroll bars, menu bars, and so forth, may be displayed along with an allocated area for displaying content, such as content that has been served (e.g., received), locally stored, and loaded, for example. As shown in FIG. 1, universal resource indicator area 165, located at a top portion of display area 162, permits display of an address for available content, for example. Display area 162 may include horizontal scroll bar 166, vertical scroll bar 168, and allocated area 170 for a browser of a non-traditional extent and/or shape (e.g., other than a web page). It should be noted, however, that the particular arrangement of FIG. 1 illustrates one of a variety of possible architectures capable of being employed to perform client side browser notification resulting from display of content within a browser. Therefore, claimed subject matter is, of course, not limited in this regard.

In FIG. 1, allocated area 170 may correspond to, for example, a portion of a display, such as display area 162 of device 160, as discussed. Thus, display area 162 may accommodate one or more scroll bars, one or more areas used for displaying universal resource indicators, toolbars, pop-ups, menu bars, and so forth. Of course, claimed subject matter is not limited to illustrations, such as this example. Allocated area 170 may display content as well as an embedded object 164, such as may represent a promotional message, for example. In implementations, allocated area 170 may be related to display of served content and may account for at least 50% of display area 162 in an embodiment, although claimed subject matter is not limited in this respect.

In FIG. 1, a browser operating to provide display area 162 may implement a feature in which, for example, by scrolling (e.g., 163) in an upward or downward direction, content may be added or appended, such as to a lower or upper portion of allocated area 170 seamlessly or transparently. Likewise, by scrolling to the right, (e.g., 167) content may be added or appended to the right of allocated area 170 seamlessly or transparently (and likewise by scrolling to the left). However, in at least some embodiments, horizontal scroll bar 166, which may include feature 167, may not necessarily be included, for example. Accordingly, claimed subject matter is intended to cover embodiments in which at least one scroll bar, which may be oriented in a horizontal, vertical, circular, or any other direction, may be employed. Likewise, as previously mentioned a browser including capabilities, such as previously described, for example, may be of any extent and/or shape. Likewise, different types of devices may employ browsers that may differ with respect to extent and/or shape. Also, other operations may generate notification, as discussed.

Figure 2A:
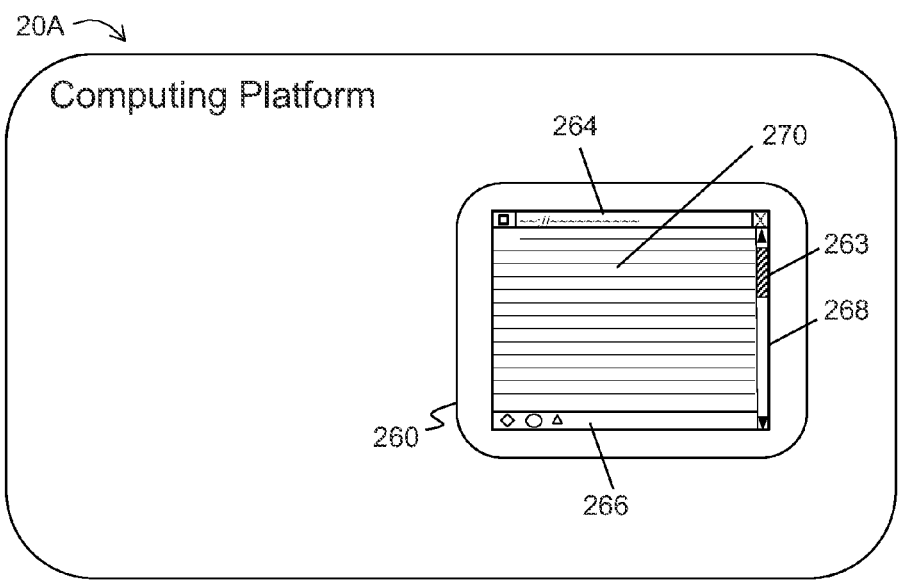
FIGS. 2A-3 are representations of content displayed on a client side device according to an embodiment.

FIG. 2A is a representation of content displayed by an associated display device 160 according to an embodiment 20A. In the example of FIG. 2A, allocated area 270 within a browser displayed on display device 260 is shown comprising content that has been accessed. A vertical scroll bar 268 may be seen at the right of allocated area 270 with a thumb scroll bar towards a top portion. Universal resource indicator area 264 and toolbar 266 respectively border a top and bottom of allocated area 270 in this embodiment.

In one possible example, to illustrate an embodiment, if the display were 1000 pixels by 1000 pixels, allocated area 270 may represent pixels at locations 1-1000 by 1-1000, for example. Scroll bar 268 may have a calibrated position, such as in accordance with a feature 263 at a top portion of the scroll bar, for example, proximate with universal resource indicator area 264. In one possible example, content in FIG. 2A may correspond to pixels at row locations below 1000; however, as shown in FIG. 2B, scrolling down 1000 rows, for example, reveals an embedded object ("Deal!"), as shown in FIG. 2B, now occupying locations in rows below 1000, whereas previously (e.g., before scrolling), the embedded object was not displayed.

Figure 2B:
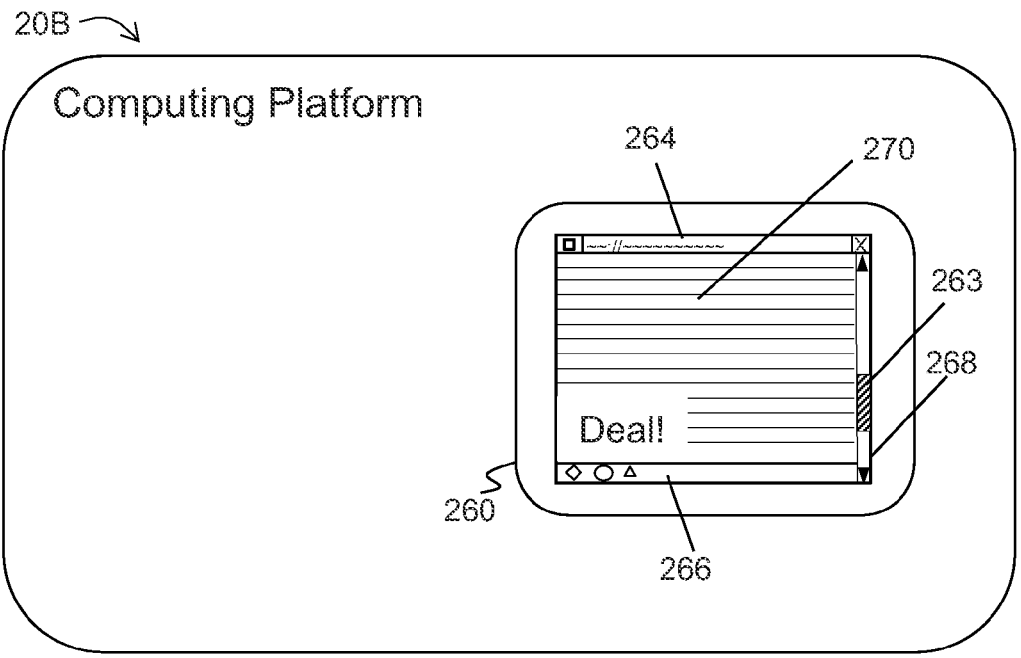

FIG. 2B is a representation of content displayed after scrolling down 1000 rows, as was mentioned. FIG. 2B includes many of the features present in the computing platform of FIG. 2A. Here, an embedded object can also be seen in allocated area 270. FIG. 2B also shows vertical scroll bar 268 having a thumb or other feature positioned at a relative middle portion of vertical scroll bar 268. Thus, with calibration, a client side browser notification may be generated as a result of scrolling, for example, such as if a vertical midpoint is crossed, for example. In a possible example, to illustrate an embodiment, allocated area 270 of FIG. 2B may represent content in an area corresponding to rows that are below the content for the rows shown in FIG. 2A. Scroll bar 268 may be calibrated to locate feature 263 at a middle vertical or midpoint of the scroll bar, for example, as mentioned. In FIGS. 2A and 2B, content may be arranged and/or calibrated for display with respect to allocated areas of a browser displayed by way of display device 260, for example. As mentioned, a browser of any extent and/or any shape may be employed rather than a page oriented browser.

If allocated area 270 is relatively small, such as may be encountered if a client platform resembles a smart phone or other handheld computing device, a viewable area of a display may represent a correspondingly small area. For example, if allocated area 270 comprises a 500 by 500 pixel area, for example, a content item that is 1000 pixels by 1000 pixels may correspond to four such viewable display regions. Of course, this is a simplified non-limiting illustration. Claimed subject matter is not intended to be limited in this manner. In an example, as allocated area 270 may be loaded with content and an application program running on computing platform 20B may at least initiate transmission of an electronic message, such as a notification an event, which may be processed by server 110. For particular instances, a device may be modified, such as via hardware, software and/or firmware, to indicate and/or take into account a relationship between pixels displayed in an allocated area in comparison with a number of pixels comprising a content item.

In an embodiment, as previously mentioned, a velocity or rate of change of a scroll bar feature (e.g., a scroll bar thumb) may be measured or estimated for an approximately horizontal and/or an approximately vertical dimension. Thus, for example, if an embedded object associated with a promotional message ("Deal!") comprises a self-revealing advertisement that is revealed as a function of time, a velocity computation may permit a scroll bar application to generate a notification that an advertisement or other promotional message was likely not viewed in allocated area 270, for example. In an example, a computed velocity relative to a threshold may indicate that a promotional message was likely to have been viewed or was unlikely to have been viewed.

Figure 3:
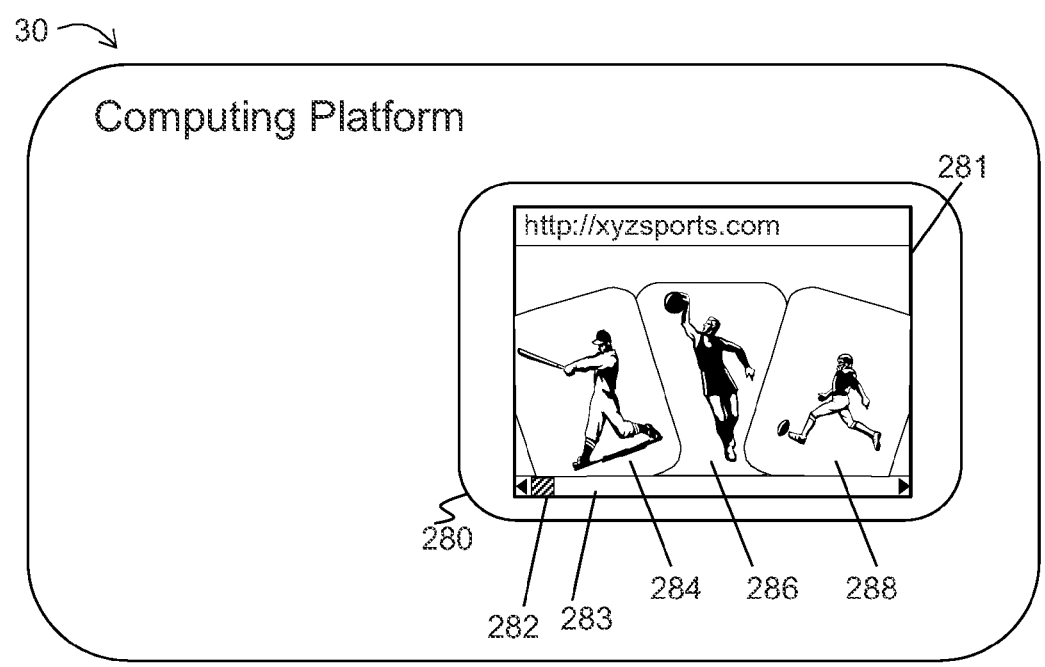

FIG. 3 is a representation of other content displayed on a display according to another embodiment. FIG. 3 shows a computing platform 30 in which display device 280 displays content within a viewable display area. Display device 280 depicts a scheme for displaying content in a manner that may be analogous to a hand of cards as viewed from a card holder's perspective. Feature 282 may correspond to a thumb of a scroll bar to be moved horizontally along horizontal scroll bar 283 in a right-hand direction, for example, so that images 284, 286, and 288 may move in a left-hand direction, for example. Device display 280 may implement a browser in which, as a user may move feature 282 to the right, content in the form of images may continue to scroll approximately horizontally, in a left-hand direction, for example.

Within allocated area 281, thus, as a user of a client platform, such as computing platform 30, scrolls to the right, electronic signals representing content may be displayed via display device 270. In one possible example, content may correspond to image files compatible with Joint Photographic Experts Group (JPEG) standards, for example, although any number of file types for images, text, music files, multimedia files, and so forth may be used, and claimed subject matter is not limited in this regard.

In one possible example, to illustrate an embodiment of FIG. 3, allocated area 281 may represent pixels at locations 1-1000 by 1-1000 that correspond to images 284, 286, and 288, for example. Scroll bar 283 may be calibrated to position feature 282 at a left-hand portion of the scroll bar, for example, proximate with the left-hand side of display device 280. In one possible example, additional content may be displayed via display device 280. In implementations, as additional content is scrolled and thereby displayed, an electronic message may be generated to provide notification, such as to a server, since scrolling indicates viewing of an object at a calibrated position.

Figure 4:
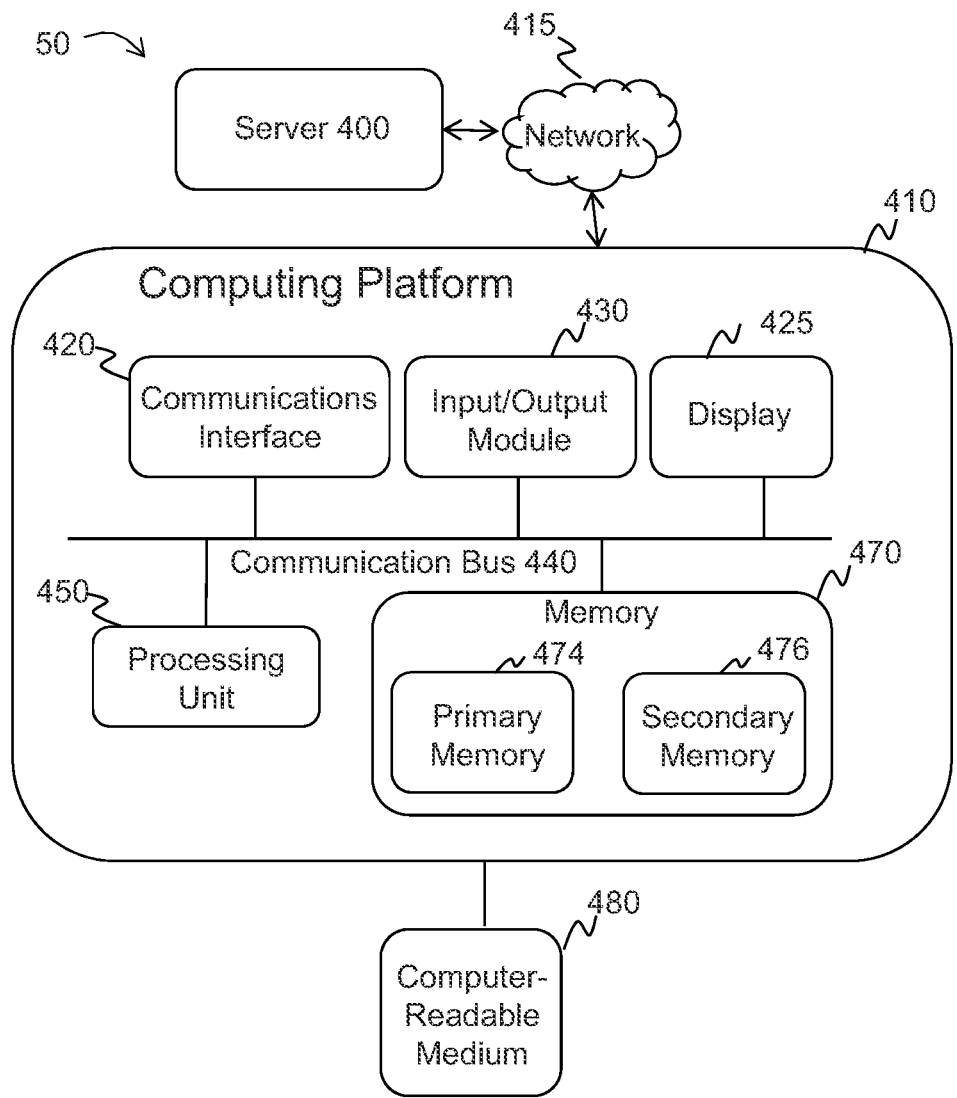
FIG. 4 is a schematic diagram of a computing platform that may be employed to implement client side browser notification according to an embodiment.

For purposes of illustration, FIG. 4 is an illustration of an embodiment of a computing platform or computing device 410 that may be employed in a client-server type interaction, such as described infra. In FIG. 4, server 400 may interface with a client 410, which may comprise features of a conventional client device, for example. Communications interface 420, processor (e.g., processing unit) 450, and memory 470, which may comprise primary memory 474 and secondary memory 476, may communicate by way of communication bus 440, for example. In FIG. 4, client 410 may store various forms of content, such as analog, uncompressed digital, lossless compressed digital, or lossy compressed digital formats for content of various types, such as video, imaging, text, audio, etc. in the form physical states or signals, for example. Client 410 may communicate with server 400 by way of an Internet connection via network 415, for example. Although the computing platform of FIG. 4 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 450 may be representative of one or more circuits, such as digital circuits, to perform at least a portion of a computing procedure or process. By way of example but not limitation, processor 450 may comprise one or more processors, such as controllers, microprocessors, microcontrollers, application specific integrated circuits, digital signal processors, programmable logic devices, field programmable gate arrays, and the like, or any combination thereof. In implementations, processor 450 may perform signal processing to manipulate signals or states or to construct signals or states, for example.

Memory 470 may be representative of any storage mechanism. Memory 470 may comprise, for example, primary memory 474 and secondary memory 476, additional memory circuits, mechanisms, or combinations thereof may be used. Memory 470 may comprise, for example, random access memory, read only memory, or one or more data storage devices or systems, such as, for example, a disk drive, an optical disc drive, a tape drive, a solid-state memory drive, just to name a few examples. Memory 470 may be utilized to store a program, as an example. Memory 470 may also comprise a memory controller for accessing computer readable-medium 480 that may carry and/or make accessible content, code, and/or instructions, for example, executable by processor 450 or some other controller or processor capable of executing instructions, for example.

Under the direction of processor 450, memory, such as cells storing physical states, representing for example, a program, may be executed by processor 450 and generated signals may be transmitted via the Internet, for example. Processor 450 may also receive digitally-encoded signals from server 400.

Network 415 may comprise one or more communication links, processes, and/or resources to support exchanging communication signals between a client and server, which may, for example, comprise one or more servers (not shown). By way of example, but not limitation, network 415 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing platform," as used herein, refers to a system and/or a device, such as a computing device, that includes a capability to process and/or store data in the form of signals and/or states. Thus, a computing platform, in this context, may comprise hardware, software, firmware, or any combination thereof (other than software per se). Computing platform 410, as depicted in FIG. 4, is merely one such example, and the scope of claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 470 may store cookies relating to one or more users and may also comprise a computer-readable medium that may carry and/or make accessible content, code and/or instructions, for example, executable by processor 450 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method of executing computer instructions on at least one computing device, without further human interaction, in which the at least one computing device includes at least one processor and at least one memory, comprising:
  accessing the computer instructions from the at least one memory of the at least one computing device for execution on the at least one processor of the at least one computing device;
  executing the accessed computer instructions on the at least one processor of the at least one computing device; and
  storing, in the at least one memory of the at least one computing device, any results of having executed the accessed computer instructions on the at least one processor of the at least one computing device,
    the computer instructions to be executed to comprise instructions to calibrate a scroll bar of a browser, an extent or shape of the browser to be not limited to a page, to associate a position of a feature of the scroll bar with a range of pixels of an area displayed within the browser, and
    the computer instructions to track, via the calibrated scroll bar, display of content for the browser, an extent or shape of the browser to be not limited to a page, and
    the computer instructions to initiate one or more client side signal transmissions substantially in accordance with the tracking.

2. The method of claim 1, wherein the browser comprises a browser of any shape.

3. The method of claim 1, wherein the content comprises one or more objects.

4. The method of claim 3, wherein the computer instructions to track, via the calibrated scroll bar, are further to:
  track the display area, the display area being an area of a display for any computing device.

5. The method of claim 3, wherein the one or more initiated client side signal transmissions is responsive to the one or more objects having a location within a specified region of the display area.

6. The method of claim 5, wherein the one or more objects having the location is in response to scrolling of the content.

7. The method of claim 5, wherein the one or more client side signal transmissions are initiated after a first and a second impression are transmitted.

8. The method of claim 5, wherein the one or more client side signal transmissions includes signals providing the location.

9. The method of claim 5, wherein the one or more client side signal transmissions includes signals providing a time stamp associated with the location.

10. A method of executing computer instructions on at least one computing device, without further human interaction, in which the at least one computing device includes at least one processor and at least one memory, comprising:
  accessing the computer instructions from the at least one memory of the at least one computing device for execution on the at least one processor of the at least one computing device;
  executing the accessed computer instructions on the at least one processor of the at least one computing device; and
  storing, in the at least one memory of the at least one computing device, any results of having executed the accessed computer instructions on the at least one processor of the at least one computing device,
    the computer instructions to be executed to comprise instructions to calibrate a scroll bar of a browser, an extent or shape of the browser to be not limited to a page, to associate a position of a feature of the scroll bar with a range of pixels of an area displayed within the browser, and
    the computer instructions to initiate one or more client side signal transmissions responsive to scrolling content determined to be within a viewable area of the browser based, at least in part, on the calibrating of the scroll bar.

11. The method of claim 10, wherein the browser comprises a browser of any shape.

12. The method of claim 10, wherein the one or more client side signal transmissions are initiated after a first and second impression are transmitted.

13. The method of claim 10, wherein the one or more client side signal transmissions includes signals providing a location within the viewable area of the browser.

14. The method of claim 13, wherein the one or more client side signal transmissions includes signals providing a time stamp associated with the location.

15. An article comprising:
  a non-transitory storage medium having stored thereon instructions executable by least one computing device, the at least one computing device comprising at least one processor and at least one memory, to:
    execute computer instructions on the at least one processor without further human intervention, the computer instructions to be executed having been accessed from the at least one memory for execution on the at least one processor and the at least one computing device to store in the at least one memory of the at least one computing device any results to be generated from the execution on the at least one processor of the to be executed computer instructions,
    the computer instructions to be executed comprising instructions for execution to store binary digital signal quantities to result, at least in part, from the execution of the one or more processors of the computing device, to calibrate a scroll bar, of a browser, an extent or shape of the browser to be not limited to a page, to associate a position of a feature of the scroll bar with a range of pixels of an area displayed within the browser,
    the computer instructions to track display of an object for the browser via the calibrated scroll bar and
    the one or more processors of the computing device to execute the accessed instructions to initiate one or more client side signal transmissions responsive to the display tracking.

16. The article of claim 15, wherein the non-transitory storage medium additionally to store instructions executable by one or more processors of a computing device to:
  initiate one or more client side signal transmissions responsive to the object to be positioned at a location within a specified region of a display device.

17. The article of claim 15, wherein the non-transitory storage medium additionally to store instructions executable by one or more processors of a computing device to:

initiate one or more client side signal transmissions after at least a first impression is transmitted.

18. The article of claim 15, wherein the non-transitory storage medium additionally to store instructions executable by one or more processors of a computing device to:
initiate one or more client side signal transmissions to provide a time stamp associated with a location.

19. The article of claim 15, wherein the non-transitory storage medium additionally to store instructions executable by one or more processors of a computing device to:
track display of an object for the browser.

20. The article of claim 15, wherein the non-transitory storage medium additionally to store instructions executable by one or more processors of a computing device to:
initiate one or more client side signal transmissions responsive to a user scrolling past an embedded object.

* * * * *